United States Patent [19]

Kaneyoshi et al.

[11] Patent Number: 5,332,558

[45] Date of Patent: Jul. 26, 1994

[54] RARE EARTH OXIDE POWDER AND METHOD FOR THE PREPARATION THEREOF

[75] Inventors: Masami Kaneyoshi; Tomoyuki Yamada; Norifumi Yoshida, all of Fukui, Japan

[73] Assignee: Shin-Etsu Chemical Co., Ltd., Tokyo, Japan

[21] Appl. No.: 58,134

[22] Filed: May 10, 1993

Related U.S. Application Data

[63] Continuation-in-part of Ser. No. 813,012, Dec. 24, 1991, abandoned.

[51] Int. Cl.$^5$ .......................... C01F 17/00; C07F 5/00
[52] U.S. Cl. ...................... 423/21.1; 423/263; 534/16
[58] Field of Search .................. 423/263, 593, 21.1; 252/301.4 R; 534/16

[56] References Cited

U.S. PATENT DOCUMENTS

| | | | |
|---|---|---|---|
| 3,420,860 | 1/1969 | Ropp | 534/16 |
| 3,574,130 | 4/1971 | Mathers et al. | 252/301.4 R |
| 3,574,131 | 4/1971 | Ferri et al. | 252/301.4 R |
| 3,577,351 | 5/1971 | Dodds | 252/301.4 R |
| 3,684,730 | 8/1972 | Sobon | 252/301.4 R |
| 3,798,173 | 3/1974 | Nath et al. | 252/301.4 R |
| 3,870,650 | 3/1975 | Ferri et al. | 252/301.4 R |
| 4,032,471 | 6/1977 | Luckey | 252/301.4 R |
| 4,650,652 | 3/1987 | Naitou et al. | 423/21.1 |

FOREIGN PATENT DOCUMENTS

| | | | |
|---|---|---|---|
| 0455529A1 | 4/1991 | European Pat. Off. | |
| 3502907A1 | 1/1985 | Fed. Rep. of Germany | 423/263 |
| 55-28905 | 2/1980 | Japan | 534/16 |
| 60-166222 | 8/1985 | Japan | 423/263 |
| 3-23213 | 1/1991 | Japan | |

OTHER PUBLICATIONS

Barrett, M. F., et al, "Double Ammonium Oxalates . . . Yttrium", J. Inorg. Nucl. Chem., 1964, vol. 26, pp. 931–936.

"Encyclopedia of Chemical Technology", (Kirk-Othmer) Third Edition, vol. 7, pp. 255–256, 1979.

Primary Examiner—Michael Lewis
Assistant Examiner—Steven Bos
Attorney, Agent, or Firm—Wenderoth, Lind & Ponack

[57] ABSTRACT

An improved method is proposed for the preparation of a powder of rare earth oxide of which the particles have a predominantly polyhedral configuration with a relatively large particle size to be suitable, for example, as a host of phosphors. The method comprises the steps of (a) precipitating a rare earth ammonium oxalate by the admixture of an aqueous solution of a rare earth salt and ammonium oxalate, (b) separating the precipitates from the aqueous medium, (c) washing the same with deionized water to be freed from electrolytes, (d) dispersing and keeping the precipitates in a hot water bath at 50° C. or higher for at least 15 minutes, (e) collecting the precipitates and (f) calcining the precipitates of the rare earth ammonium oxalate into oxide. It is essential that the steps (a) to (c) are conducted at a temperature of 40° C. or below or, preferably, 30° C. or below. The thus obtained precipitates of rare earth ammonium oxalate has a unique crystallographic structure not reported in any literatures, which, however, is a metastable phase gradually transformed into the known crystallographic structure.

5 Claims, 3 Drawing Sheets

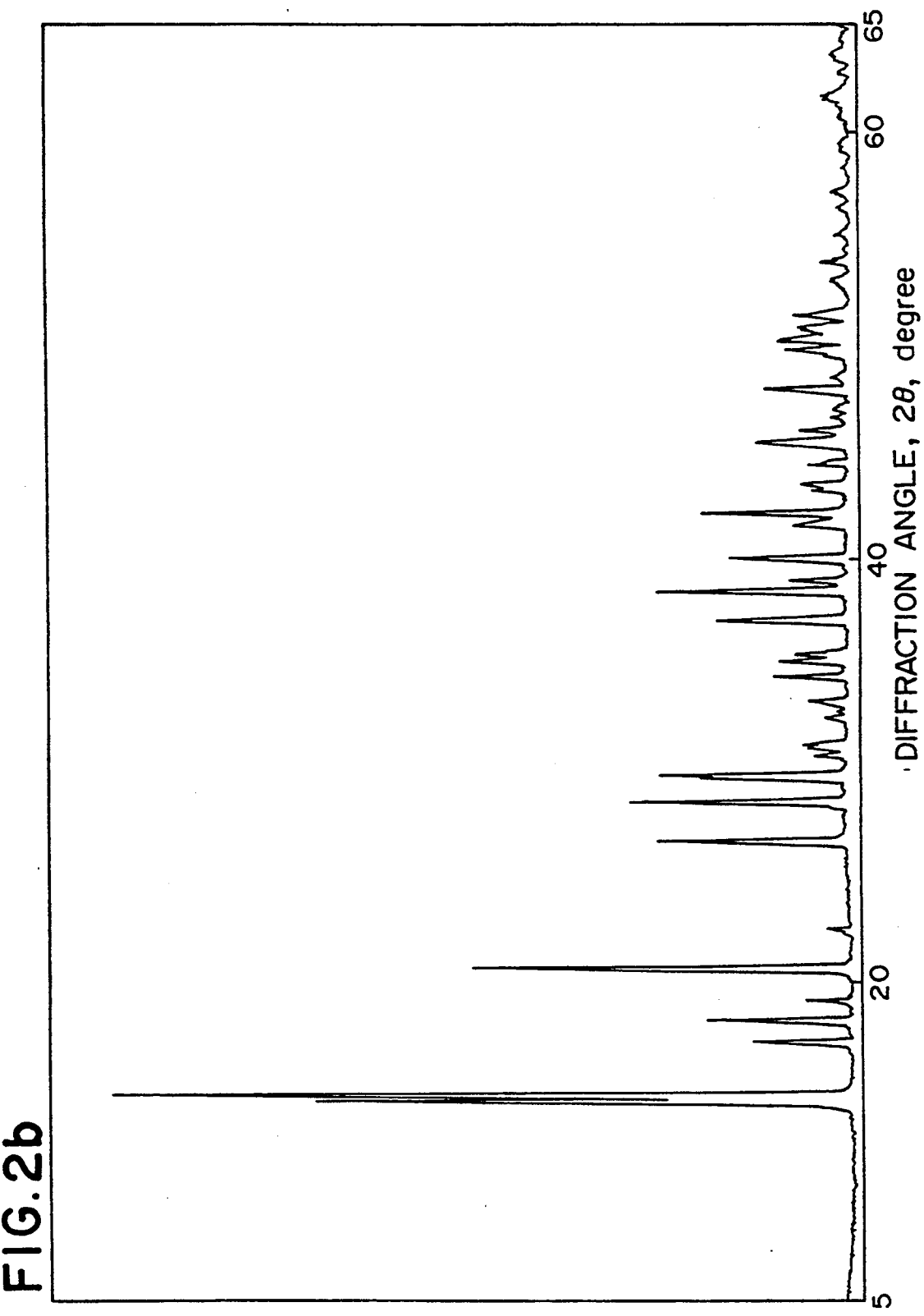

RARE EARTH OXIDE POWDER AND METHOD FOR THE PREPARATION THEREOF

This is a continuation-in-part application from a co-pending U.S. patent application Ser. No. 07/813,012 filed Dec. 24, 1991, now abandoned.

BACKGROUND OF THE INVENTION

The present invention relates to a rare earth oxide powder and a method for the preparation thereof. More particularly, the invention relates to a rare earth oxide powder having a unique morphological configuration of particles and specific particle size as well as particle size distribution and a method for the preparation of such a rare earth oxide powder by the procedure of calcination of a thermally decomposable salt of the rare earth element.

As is well known, oxides of rare earth elements are industrially important materials used, for example, as a starting material of the red-emitting phosphors in fluorescent lamps and color cathode-ray tubes of television sets, sintering aid in high-performance ceramics and so on.

The most typical method for the preparation of a rare earth oxide powder is calcination of a thermally decomposable salt of the rare earth element. Examples of the thermally decomposable salt of a rare earth element used in this process include oxalate of the rare earth element, which is obtained by mixing an aqueous solution of a water-soluble inorganic salt, e.g., chloride and nitrate, of the element and oxalic acid either as such or in the form of an aqueous solution to precipitate the oxalate, and rare earth ammonium oxalate of the formula $NH_4(RE)(C_2O_4)_2 \cdot nH_2O$, in which RE is an atom of the rare earth element, which is obtained by mixing an aqueous solution of a water-soluble inorganic salt of the rare earth element and an aqueous solution of oxalic acid in the presence of ammonia (see, for example, Journal of Inorganic and Nuclear Chemistry, volume 26, page 931, 1964, and Acta Cryst., volume 23, page 949, 1967). A rare earth ammonium oxalate can also be obtained by the reaction of a rare earth hydroxide with an ammoniacal oxalic acid solution or by the reaction of a strongly acidic solution of a rare earth oxalate with an aqueous ammonia solution and the process of thermal decomposition of the rare earth ammonium oxalate into oxide was studied and reported (see Bulletin of Chemical Society of Japan, volume 63, page 378 and page 2115, 1990). These methods are of course applicable to the preparation of an oxide powder of two kinds or more of the rare earth elements in combination as in the preparation of an europoium-doped yttrium or gadolinium oxide powder used as the base material of red-emitting phosphors.

One of the problems in the above described methods is that the particle configuration and size of the thus prepared rare earth oxide particles are uncontrollably very irregular and uneven so that, when a phosphor is prepared from such a rare earth oxide powder, the particle configuration of the phosphor is also irregular and uneven resulting in unevenness of the phosphor layer formed by coating with a phosphor-containing composition and hence unevenness of the brightness of the phosphor-coated surface under excitation. In addition, the particle size of conventional rare earth oxide powders is generally too fine as a starting material for the preparation of phosphors. A rare earth oxide powder of irregular particle configuration is also less effective as a sintering aid when it is used in the preparation of ceramic materials due to the poor dispersibility thereof. The inventors have conducted extensive investigations to solve this problem arriving at a discovery that an oxide powder can give quite satisfactory results when the particles of the oxide powder have a polyhedral particle configuration with a narrow particle size distribution.

When a rare earth ammonium oxalate is washed with water and then calcined into an oxide powder, a part of the rare earth oxide particles have a cubic or polyhedral configuration but, in this process, the fraction of the cubic or polyhedral particles cannot be large enough with a relatively small particle size. In addition, the reproducibility in respect of the particle configuration and particle size of the rare earth oxide powder cannot be high enough when the rare earth oxide is prepared in this way.

SUMMARY OF THE INVENTION

The present invention accordingly has an object to provide a rare earth oxide powder of which the particles have a predominantly polyhedral particle configuration with a relatively narrow particle size distribution to have good dispersibility and a highly reproducible method for the preparation of such a rare earth oxide powder.

Thus, the present invention provides a method for the preparation of an oxide powder of a rare earth element or a combination of two kinds or more of rare earth elements which comprises the steps of:

(a) admixing an aqueous solution of a water-soluble inorganic salt of the rare earth element and an aqueous solution of ammonium oxalate or a combination of oxalic acid and ammonia in such an amount that the molar ratio of the carboxyl groups from oxalic acid as a total in the form of the free carboxyl groups and from ammonium oxalate in the form of an ammonium salt to the rare earth atoms is at least 2 and the molar ratio of ammonia in the form of ammonia molecules and ammonium ions to the rare earth atoms is at least 1 or, preferably, at least 2 to precipitate a rare earth ammonium oxalate in the aqueous medium at a temperature not exceeding 40° C., the pH value of the aqueous medium being 1 or higher;

(b) collecting the precipitate of the rare earth ammonium oxalate by solid-liquid separation;

(c) washing the precipitate of the rare earth ammonium oxalate with deionized water at a temperature not exceeding 30° C.;

(d) dispersing the precipitate of the rare earth ammonium oxalate in a bath of deionized water at a temperature of 50° C. or higher for at least 15 minutes;

(e) collecting the precipitate of the rare earth ammonium oxalate by solid-liquid separation from the bath of deionized water; and (f) calcining the precipitate of the rare earth ammonium oxalate into an oxide powder of the rare earth element.

The rare earth oxide powder prepared in the above described method is characterized by the predominantly polyhedral configuration of the particles having a specific surface area in the range from 1 to 25 $m^2/g$, an average particle diameter in the range from 0.5 to 3.0 $\mu m$ and a QD (quartile deviation) value not exceeding 0.3.

BRIEF DESCRIPTION OF THE DRAWING

FIG. 2a is an X-ray diffraction diagram of yttrium ammonium oxalate of the low-temperature type and FIG. 2b is an X-ray diffraction diagram of yttrium ammonium oxalate of the high-temperature type.

DETAILED DESCRIPTION OF THE PREFERRED EMBODIMENTS

Figure 1:
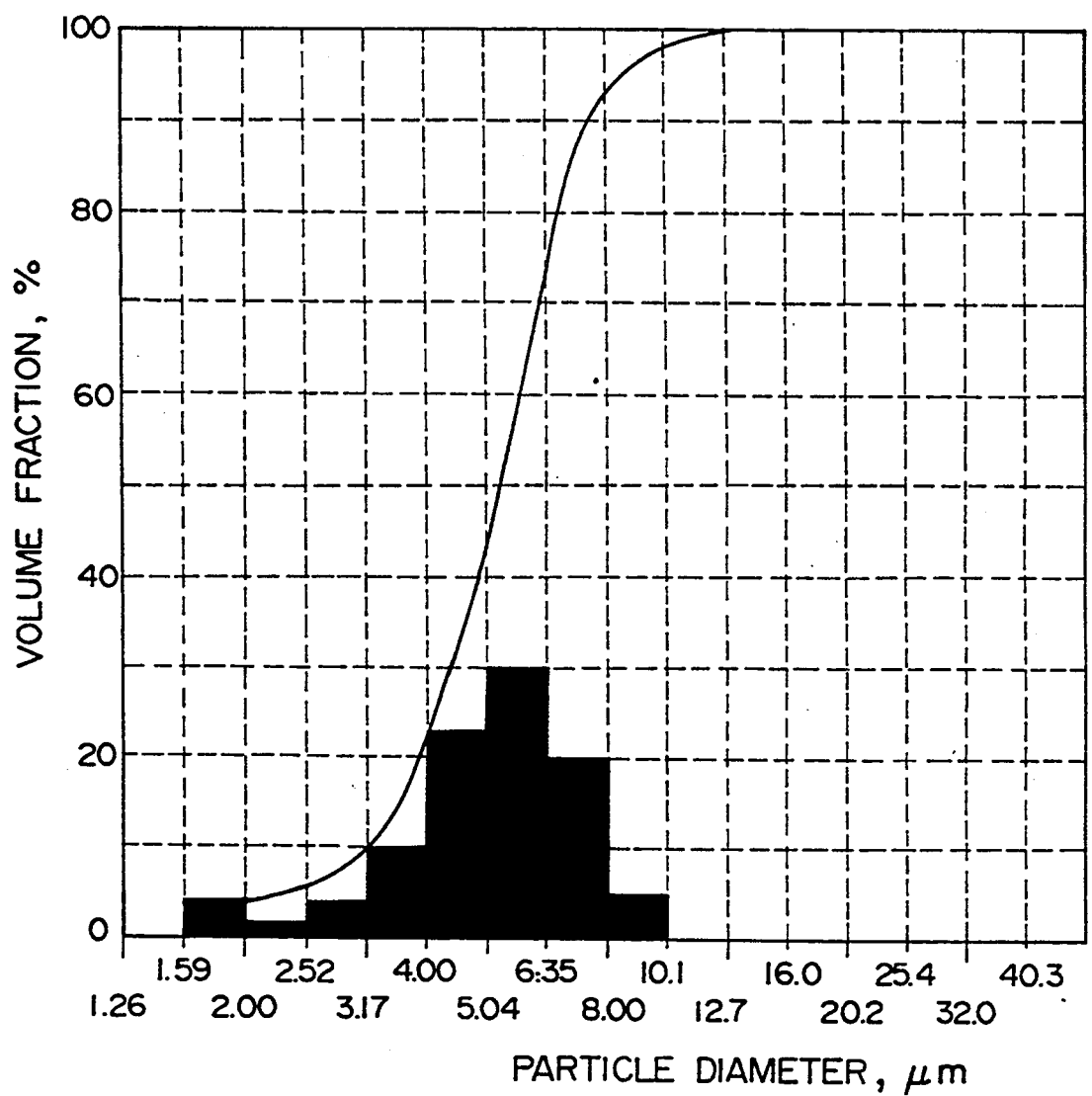
FIG. 1 is a histogram showing the particle volume vs. particle diameter distribution of the yttrium-europium oxide powder prepared in Example 1 with entry of the cumulative volume vs. particle diameter curve.

In the prior art method for the preparation of a rare earth oxide powder by the calcination of a rare earth ammonium oxalate, a crude rare earth oxide is dissolved in an inorganic acid such as nitric acid and hydrochloric acid and the solution is admixed with oxalic acid and ammonia to precipitate the rare earth ammonium oxalate. The precipitate of rare earth ammonium oxalate thus collected are usually washed with deionized water without particular temperature control followed by drying and calcination into an oxide powder.

As a result of the extensive investigations undertaken by the inventors with an object to solve the above described problems, it has been unexpectedly discovered that, when a rare earth ammonium oxalate precipitated and washed under specific cold conditions is dispersed and kept in a hot water bath at a specified temperature for a sufficiently long time prior to calcination, a large portion of the rare earth oxide particles obtained by drying and calcining the rare earth ammonium oxalate may have a predominantly polyhedral particle configuration having the above specified parameters including the specific surface area, average particle size and QD value with good reproducibility.

The inventive method comprises the above described steps (a) to (f), of which the step (a) is for the precipitation of a rare earth ammonium oxalate. The starting rare earth compound is a water-soluble inorganic salt, e.g., chloride and nitrate, of the rare earth element in the form of an aqueous solution of which the concentration of the rare earth element is preferably in the range from 0.1 to 2.0 moles/liter. This aqueous solution of the rare earth salt is admixed with ammonium oxalate or a combination of ammonia water and oxalic acid, which is also added in the form of an aqueous solution having a concentration of, preferably, from 0.1 to 1.0 mole/liter relative to the concentration of the oxalic ions. The amount or amounts of ammonium oxalate or a combination of oxalic acid and ammonia water should be sufficient such that the molar ratio of the carboxyl groups as a total in the form of the free carboxyl groups and in the form of an ammonium oxalate to the rare earth atoms of at least 2 and the molar ratio of ammonia as a total in the forms of ammonia molecules and ammonium ions to the rare earth atoms is at least 1. It is essential that this step for the precipitation of a rare earth ammonium oxalate is conducted at a temperature not exceeding 40° C. or, preferably, not exceeding 30° C. It is important that the pH value of the aqueous medium for this precipitation reaction is 1 or higher or, preferably, 1.3 or higher.

In steps (b) and (c) of the inventive method, the thus formed precipitates of the rare earth ammonium oxalate are collected by solid-liquid separation, e.g., filtration, and thoroughly washed with deionized water to be freed from any electrolytes. It is essential that these steps are conducted also at a temperature not exceeding 40° C. In particular, the deionized water used for washing of the precipitates must be at a temperature not exceeding 30° C. It is further preferable that the steps (a) to (c) are conducted as quickly as possible or within a period not exceeding two hours.

Figure 2A:
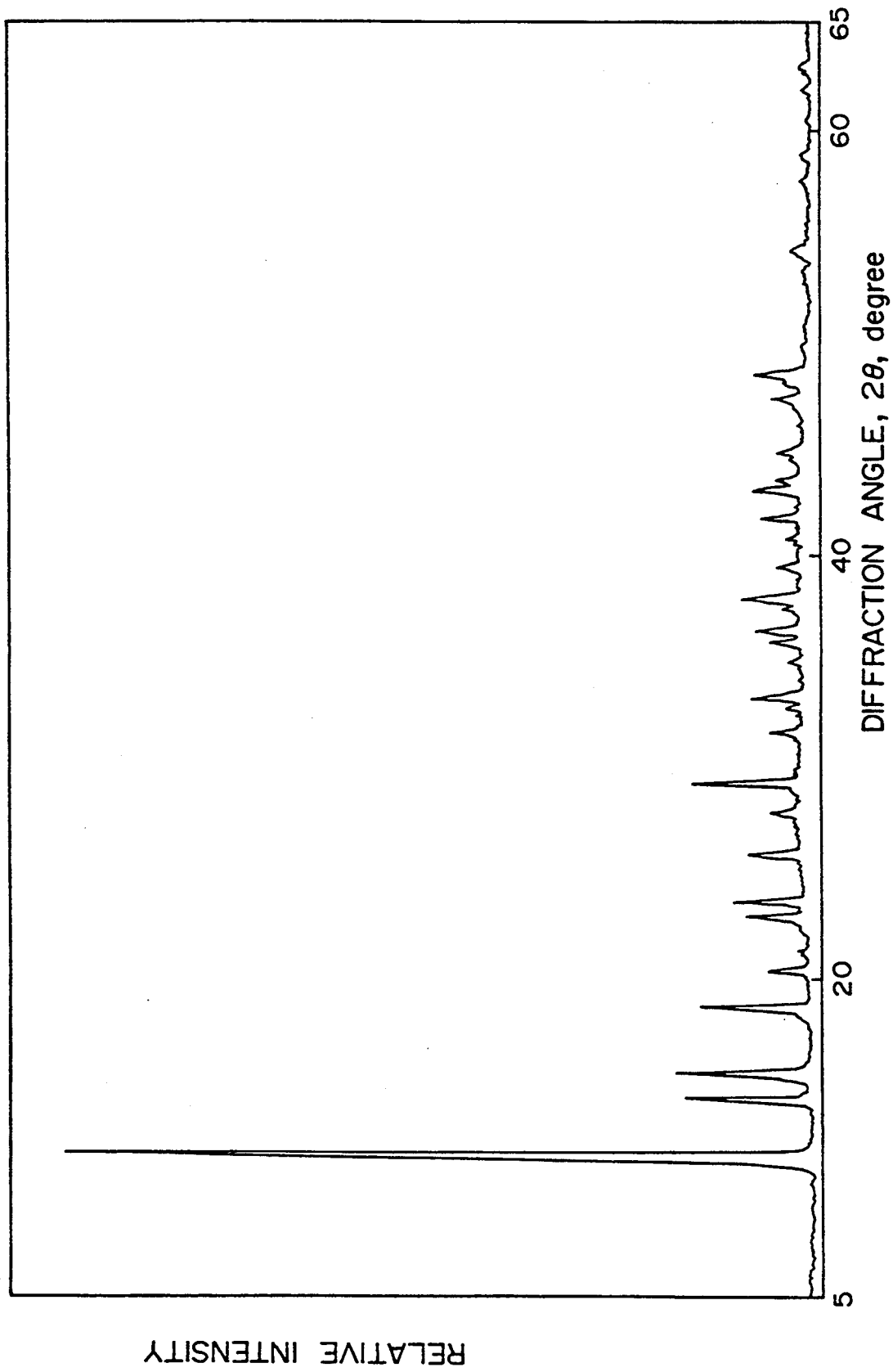

Quite unexpectedly, it has been discovered that the precipitates of the rare earth ammonium oxalate obtained in such a cold process as described above have a crystallographic structure not known in the prior art nor reported in any literature, which is referred to as the low-temperature form of the rare earth ammonium oxalate. For example, FIG. 2a illustrates an X-ray powder diffraction diagram of the low-temperature form of yttrium ammonium oxalate taken with the CuKα line as the X-rays having principal peaks at $2\theta = 11.68°, 14.40°, 15.58°$, etc. Further unexpectedly, this low-temperature form of yttrium ammonium oxalate is a metastable phase at room temperature gradually transformed into a conventional crystallographic structure of yttrium ammonium oxalate, which is referred to as the high-temperature form. FIG. 2b illustrates an X-ray powder diffraction diagram of such a high-temperature form yttrium ammonium oxalate, of which the principal peaks are found at $2\theta = 14.68°, 20.66°$, etc. Besides the difference in the X-ray diffraction diagram, the low-temperature type yttrium ammonium oxalate particles are unique in the particle configuration as examined on scanning electron-microscopic photographs although the above mentioned differences in the X-ray diffractometric crystallographic structure and particle configuration can be noticeable only when the measurements are conducted within 8 hours after the precipitate is obtained.

The precipitates of the rare earth ammonium oxalate freed from any electrolytes as completely as possible in step (c) of the inventive method is then dispersed and kept in a hot bath of deionized water. The temperature of the hot water bath for this hot-water treatment of the rare earth ammonium oxalate should be 50° C. or higher or in the range from 50° to 100° C. It is of course that the effect of the hot-water treatment would not be exhibited when the temperature of the water is lower than 50° C. while no further improvement can be obtained by increasing the temperature to exceed 100° C. by using a pressurizable closed vessel. The length of time for the hot-water treatment is at least 15 minutes or, preferably, in the range from 15 minutes to 8 hours or, more preferably, in the range from 1 to 5 hours. Extension of the time to exceed the above mentioned upper limit would give no further improvement. The amount of the hot water relative to the rare earth ammonium oxalate should be sufficient to fully disperse the precipitate under agitation. As a rough measure, the amount of hot water should be at least 5 times by weight of the rare earth ammonium oxalate but increase of the amount of water to exceed 100 times by weight of the rare earth ammonium oxalate would give no additional advantages. It is preferable that the hot water bath containing the precipitates of the rare earth ammonium oxalate dispersed therein is gently agitated during the hot-water treatment so as not to cause settling of the rare earth ammonium oxalate on the bottom of the vessel. It is important that the rare earth ammonium oxalate is thoroughly washed with deionized water prior to the hot-water treatment to be freed from any water-soluble impurities so that the hot water bath in the hot-water treatment is as free as possible from electrolyte impurities in order to have the advantages of the inventive method fully exhibited. In practice, the precipitate of the rare earth ammonium oxalate should be washed with deionized water in step (c) until no chloride ions or nitrate ions can be detected in the washings.

The procedure for the preparation of the rare earth oxide by the calcination of the thus obtained rare earth ammonium oxalate can be conventional. Following is a more particular description of the inventive method for the preparation of a rare earth oxide powder.

In the first place, a crude rare earth oxide or a combination of two kinds or more of rare earth oxides, such as europium oxide and yttrium or gadolinium oxide, as the starting material is dissolved in an inorganic acid, such as nitric and hydrochloric acids, to give an aqueous solution of the rare earth nitrate or chloride, of which the concentration of the rare earth element is in the range from 0.1 to 1.0 mole/liter and the concentration of the free acid does not exceed 1.5 moles/liter. In the next place, an aqueous solution of oxalic acid in a concentration of 1 to 30% by weight and an ammonia water of, for example, 28% concentration are added to the aqueous rare earth salt solution under agitation at a temperature not exceeding 40° C. so that precipitate of the rare earth ammonium oxalate of the formula $NH_4(RE)(C_2O_4)_2 \cdot nH_2O$, in which RE is an atom of the rare earth element is formed. The amount of the oxalic acid is, preferably, in the range from 2.0 to 2.5 moles per mole of the rare earth element and the amount of ammonia is in the range from 2 to 4 moles per mole of the oxalic acid. The order of addition of the oxalic acid solution and the ammonia water is not particularly limitative. The precipitate of the rare earth ammonium oxalate is collected by filtration, thoroughly washed with deionized water and then subjected to the hot-water treatment by dispersing the same in an electrolyte-free hot water bath at 50° to 100° C. for at least 15 minutes under gentle agitation. Therefore, the precipitate is again separated from the hot-water bath, dried and calcined at a temperature in the range from 800° to 1000° C. for a length of time in the range from 1 to 4 hours so that the rare earth ammonium oxalate is decomposed and converted into the corresponding rare earth oxide in the form of a powder of which the particles predominantly have a cubic or polyhedral configuration with the above specified parameters including the specific surface area, average particle size and QD value.

The method of the present invention is applicable to the preparation of the oxide of any of the rare earth elements including yttrium and the elements having an atomic number of 57 through 71 inclusive in the Periodic Table. It is of course that the method of the present invention is applicable to the preparation of a mixed oxide powder of two kinds or more of the rare earth elements, such as a combination of europium and yttrium or gadolinium, according to need.

As is mentioned above, the rare earth oxide powder obtained by the above described method has a specific surface area in the range from 1 to 25 m²/g. The specific surface area of a powder can be determined by the so-called BET method. The average particle diameter of a powder can be determined by using instruments working on several different principles which may give somewhat different results. Accordingly, the above mentioned average particle size of 0.5 to 3.0 μm should be determined by the Fischer's method. When the average particle size is determined by using a so-called Coulter Counter, this range corresponds to a range from 1 to 10 μm. The QD (quartile deviation) value, which does not exceed 0.3 in the rare earth oxide powder prepared according to the inventive method, is a value determined by the equation $$QD = (D_{75} - D_{25})/(D_{75} + D_{25}),$$

in which $D_{75}$ and $D_{25}$ are each the diameter of the particles corresponding to 75% and 25%, respectively, of the cumulative volume on the graph of the particle diameter distribution giving the cumulative volume as a function of the particle diameter. Such a particle size distribution curve can be prepared, for example, by using a Coulter Counter capable of giving the volume fraction of the particles having diameters in a narrow range.

In the following, examples are given to illustrate the method of the invention in more detail although the scope of the invention is never limited thereby in any way.

EXAMPLE 1

A mixed rare earth nitrate aqueous solution was prepared by dissolving 94.5 g of yttrium oxide and 5.5 g of europium oxide in 200 ml of a concentrated nitric acid followed by the addition of water to make up a volume of 3.3 liters. Separately, an aqueous ammoniacal oxalic acid solution was prepared by dissolving 240 g of oxalic acid dihydrate in 6.6 liters of water and adding 290 ml of a 28% ammonia water thereto. The mixed rare earth nitrate solution cooled to room temperature was added gradually to this oxalic acid solution under agitation at room temperature taking 20 minutes and agitation was further continued for additional 10 minutes. The pH value of the aqueous medium was 2.0. The precipitate thus formed was collected by filtration under suction and repeatedly washed with deionized water until no nitrate ions could be detected in the washing taking 1.5 hours as measured from the start of the precipitation reaction. The precipitate after washing was added to 8 liters of deionized water at 50° C. and dispersed therein by agitation and the dispersion was agitated for 4 hours at 60° C. The dispersion was filtered to collect the precipitate which was dried and calcined for 2 hours at 900° C. to give a powder of mixed rare earth oxide of yttrium and europium. This oxide powder was examined by the scanning electron microscopy to find that the particles mostly has a polyhedral configuration. The powder had a specific surface area of 6.8 m²/g as determined by using an instrument Flow Souve 2300 (manufactured by Micromeritex Co.), an average particle diameter of 1.71 μm as determined by using a Fischer Subsieve Sizer Model 95 (manufactured by Fischer Co.) and a QD value of 0.20 calculated from a cumulative particle volume distribution curve prepared by using the histogram of the volume fractions of particles obtained by using a Coulter Model TA-II (manufactured by Coulter Electronics Co.) and shown in FIG. 1 of the accompanying drawing.

EXAMPLES 2 to 5

The experimental procedure for the preparation of a yttrium-europium mixed oxide powder in each of these Examples was substantially the same as in Example 1 described above except that the temperature of the hot-water treatment was 65° C. and 70° C. in Examples 2 and 3, respectively, instead of 60° C. and the calcination of the yttrium-europium mixed ammonium oxalate was carried out at 800° C. and 1000° C. in Examples 4 and 5, respectively, instead of 900° C. The specific surface area, average particle diameter and QD value of each of the oxide powders are shown in Table 1 below which also includes the data obtained in Example 1.

EXAMPLES 6 AND 7.

The experimental procedure for the preparation of a rare earth oxide powder was substantially the same as in Example 1 described above excepting replacement of 94.5 g of the starting yttrium oxide with 151.4 g of gadolinium oxide and increase of the temperature of the hot-water treatment from 60° C. to 80° C. and 85° C. in Examples 6 and 7, respectively. The specific surface area, average particle diameter and QD value of each of the gadolinium-europium mixed oxide powders are shown in Table 1 below.

EXAMPLE 8 comparative

Into an aqueous solution prepared by dissolving 114 g of oxalic acid dihydrate in 5.9 liters of water with addition of 150 ml of a 28% ammonia water were added 615 ml of an aqueous solution of mixed rare earth nitrates of yttrium and europium, of which the overall rare earth concentration was 0.7 mole/liter with a yttrium-:europium molar ratio of 96:4 and the free acid concentration [H+] was 0.15 mole/liter, under agitation taking 2 minutes and agitation of the mixture was further continued for additional 10 minutes. The thus formed precipitate was collected by filtration, washed with 4 liters of deionized water at room temperature and calcined for 2 hours at 900° C. to give a powder of mixed rare earth oxides of yttrium and europium, of which the particles mostly had a scaly or irregular configuration as was found on the scanning electron microphotograph. The specific surface area, average particle diameter and QD value of the powder are shown in Table 1.

EXAMPLE 9 comparative

Into an aqueous solution prepared by dissolving 14.2 g of ammonium oxalate monohydrate in 400 ml of water was added an aqueous yttrium nitrate solution prepared by dissolving 19.1 g of yttrium nitrate hexahydrate in 200 ml of water taking 12 minutes under agitation to form precipitate. The dispersion of the precipitate was heated at 70° C. and agitation was continued for 4 hours at this temperature. Thereafter, the precipitate was collected by filtration, washed with 500 ml of deionized water at room temperature and calcined for 2 hours at 900° C. to give a powder of yttrium oxide, of which the particles mostly had a scaly or irregular configuration. The specific surface area, average particle diameter and QD value of the powder are shown in Table 1.

EXAMPLE 10 comparative

The experimental procedure was substantially the same as in Example 1 excepting omission of the hot-water treatment of the precipitates of the rare earth ammonium oxalate as dispersed in 8 liters of deionized water at 60° C. for 4 hours. The particles of the rare earth oxide powder thus prepared mostly had a scaly configuration. The specific surface area, average particle diameter and QD value of the powder are shown in Table 1.

EXAMPLE 11 comparative

The experimental procedure was substantially the same as in Example 1 except that the precipitate of rare earth ammonium oxalate after washing with water was added to and dispersed in 8 liters of deionized water at 40° C. and the dispersion was agitated for 8 hours at 40° C. instead of 60° C. The particles of this rare earth oxide powder thus prepared mostly had a scaly configuration. The specific surface area, average particle diameter and QD value of the powder are shown in Table 1.

TABLE 1

| Example No. | Specific surface area, $m^2/g$ | Average particle diameter, $\mu m$ | QD value |
|---|---|---|---|
| 1 | 6.8 | 1.71 | 0.20 |
| 2 | 7.2 | 1.20 | 0.21 |
| 3 | 6.8 | 0.87 | 0.24 |
| 4 | 15.4 | 1.08 | 0.21 |
| 5 | 4.0 | 1.30 | 0.28 |
| 6 | 6.4 | 1.32 | 0.21 |
| 7 | 8.7 | 0.94 | 0.22 |
| 8* | 6.8 | 0.87 | 0.32 |
| 9* | 6.5 | 2.2 | 0.54 |
| 10* | 9.2 | 0.65 | 0.42 |
| 11* | 5.0 | 0.91 | 0.33 |

*Comparative example

What is claimed is:

1. A method for the preparation of an oxide powder of a rare earth element or a combination of two or more rare earth elements which comprises the steps of:
   (a) admixing an aqueous solution of a water-soluble inorganic salt of the rare earth element and an aqueous solution of ammonium oxalate or a combination of oxalic acid and ammonia in such an amount that the molar ratio of the carboxyl groups from said oxalic acid in the form of free carboxyl groups and from said ammonium oxalate in the form of an ammonium salt to the rare earth atoms is at least 2 and the molar ratio of ammonia in the form of ammonia molecules and ammonium ions to the rare earth atoms is at least 1, to precipitate a rare earth ammonium oxalate in the aqueous medium at a temperature not exceeding 40° C., the pH value of the aqueous medium being 1 or higher;
   (b) collecting the precipitate of the rare earth ammonium oxalate by solid-liquid separation;
   (c) washing the precipitate of the rare earth ammonium oxalate with deionized water at a temperature not exceeding 30° C. for a period of a lower limit of either 1.5 hours or until no nitrate ions are detected up to 2 hours as an upper limit;
   (d) dispersing the precipitate of the rare earth ammonium oxalate in a bath of deionized water at a temperature of 50° C. or higher for at least 15 minutes;
   (e) collecting the precipitate of the rare earth ammonium oxalate by solid-liquid separation from the bath of deionized water; and
   (f) calcining the precipitate of the rare earth ammonium oxalate into an oxide powder of the rare earth element.

2. The method as claimed in claim 1 in which the temperature of the bath of deionized water in step (d) is in the range from 50° C. to 100° C.

3. The method as claimed in claim 1 in which the precipitates are dispersed in the bath of deionized water in step (d) for a length of time of at least 15 minutes.

4. The method as claimed in claim 3 in which the precipitates are dispersed in the bath of deionized water in step (d) for a length of time in the range from 1 hour to 5 hours.

5. The method as claimed in claim 1 in which the amount of the deionized water in step (d) is at least 5 times by weight of the amount of the rare earth ammonium oxalate.

* * * * *